US011568378B2

United States Patent
Laserson et al.

(10) Patent No.: US 11,568,378 B2
(45) Date of Patent: Jan. 31, 2023

(54) DATA-DRIVEN PARTIAL RESCAN PRECISION BOOSTER

(71) Applicant: NCR Corporation, Atlanta, GA (US)

(72) Inventors: Itamar David Laserson, Givat Shmuel (IL); Loran Halfon, Ramat Gan (IL); Tali Shpigel, Bnei brak (IL)

(73) Assignee: NCR Corporation, Atlanta, GA (US)

( * ) Notice: Subject to any disclaimer, the term of this patent is extended or adjusted under 35 U.S.C. 154(b) by 183 days.

(21) Appl. No.: 16/696,922

(22) Filed: Nov. 26, 2019

(65) Prior Publication Data

US 2021/0158318 A1    May 27, 2021

(51) Int. Cl.
| | | |
|---|---|---|
| G06Q 20/40 | (2012.01) | |
| G06Q 20/20 | (2012.01) | |
| G06Q 20/18 | (2012.01) | |
| G06N 20/00 | (2019.01) | |

(52) U.S. Cl.
CPC ............ *G06Q 20/18* (2013.01); *G06N 20/00* (2019.01); *G06Q 20/208* (2013.01)

(58) Field of Classification Search
CPC combination set(s) only.
See application file for complete search history.

(56) References Cited

U.S. PATENT DOCUMENTS

| | | | | |
|---|---|---|---|---|
| 2003/0102373 | A1* | 6/2003 | Swartz ............... | G07G 1/0054 235/383 |
| 2019/0188579 | A1* | 6/2019 | Manoharan ........ | G06Q 20/4016 |
| 2019/0287113 | A1* | 9/2019 | Wright ................ | G06K 7/1417 |

* cited by examiner

*Primary Examiner* — Peter Ludwig
*Assistant Examiner* — Reva R Moore
(74) *Attorney, Agent, or Firm* — Schwegman, Lundberg & Woessner

(57) ABSTRACT

A transaction is identified for a partial rescan security check based at least in part on basket items of the transaction. A total number of rescan items from the basket items is identified for rescan; the total number of rescan items selected for rescan is less than a total number of the basket items in the transaction. Based on the basket items and transaction features for the transaction, item categories or item departments are identified from which the total number of rescan items are to be selected from the basket items for the rescan security check. The total number of rescan items and the item categories for selection are provided to an attendant terminal for the rescan security check. The rescan security check is processed to determine whether the transaction was associated with theft or not associated with theft.

9 Claims, 4 Drawing Sheets

DATA-DRIVEN PARTIAL RESCAN PRECISION BOOSTER

BACKGROUND

A typical retailer wastes approximately 800,000 hours a year on security rescans on Self-Service (SS) transactions. To save time and cut down on rescans, retails will apply partial rescans where only a sample of the items in a transaction is randomly rescanned. However, the result of this practice ensures the rescans will most likely miss rescanning actual stolen items even in transactions that include stolen items.

Rescans are only performed on a very small percentage of transaction and intended to validate that a customer had scanned all his/her items properly and did not exit the store with items that were unpaid for.

Rescanning takes valuable time from both the attendant monitoring SS transactions and the frustrated customers standing in line awaiting access to checkout.

As an example, consider a transaction having 10 items, one of which is a stolen item (was intentionally not scanned by the shopper). If an attendant rescans this transaction and the attendant is requested to rescan 2 random items from the 9 items that the shopper actually scanned (1 unscanned item is being stolen and was not accounted for in the scanning performed by the shopper), this represents 22% (2/9) of the total scanned transaction. The probability of detecting the theft is approximately 19%.

Typically, only 5-10% of transactions are actually flagged for rescanning in the industry, which means that roughly there is approximately a 1.5% that retailers will actually detect theft.

As a result, retailers are facing a trade-off. On the one hand, the higher the portion of the transaction items that are included in rescanning, the more likely the retailer is to recover stolen items (assuming the stolen items exists). On the other hand, the higher the portion of the transaction items that are included in rescanning, the longer it takes for the rescan process to complete and more time is wasted.

Overall while partial rescans are very good in reducing the time wasted on rescans, they provided very low precision in detecting actual cases of customer theft.

SUMMARY

In various embodiments, methods and a system for increasing the precision of partial rescans are presented.

According to an aspect, a method for increasing the precision of partial rescans is presented. Specifically,

DETAILED DESCRIPTION

Figure 1:
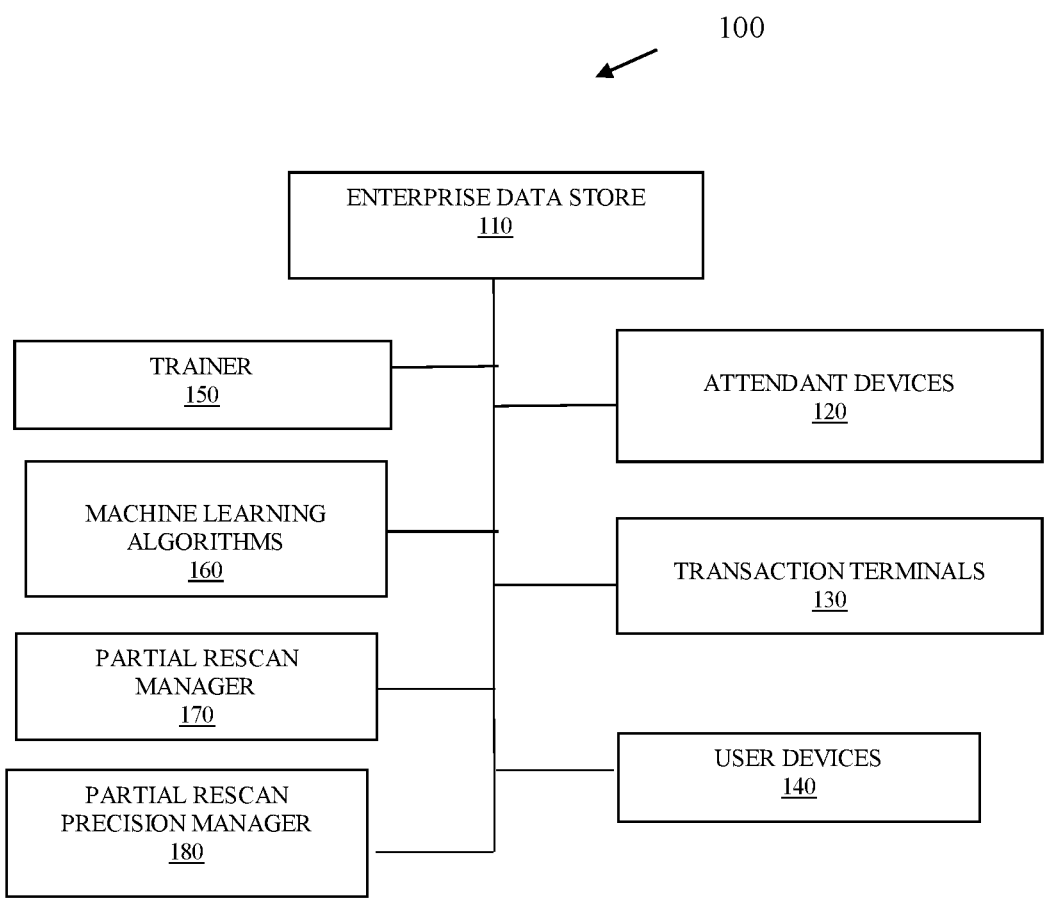
FIG. 1 is a diagram of a system for increasing the precision of partial rescans, according to an example embodiment.

FIG. 1 is a diagram of a system 100 for increasing the precision of partial rescans, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of increasing the precision of partial rescans presented herein and below.

The system 100 provides a mechanism by which a machine-learning algorithm can be trained with at least features including: transaction-based items of transaction (basket items), transaction features of the transaction, and known items that were stolen based on previous analysis of transaction logs for the transactions. The machine-learning algorithm takers the features as input and the known items that were stolen for each training transaction and derives an algorithm that when provided live basket items and live transaction features as input for a given transaction that has already been flagged for a partial rescan security check, produces output. The output identifies how many items of the total items in the given transaction should be rescanned and what departments, categories, or types of items from the total number of items that are to be rescanned should be selected for rescanning. The trained machine-learning algorithm provides a focused and more accurate rescan of the basket items in any given transaction that was selected for a rescan security check. This increases the precision or accuracy of the rescan security process and substantially increases the likelihood that a given transaction involving a theft will be identified.

The system 100 includes an enterprise data store 110, a variety of attendant devices 120, transaction terminals 130, user/customer operated devices 140, a trainer 150, machine-learning algorithms 160, a partial rescan manager 170, and a partial rescan precision manager 180.

Trainer 150, machine-learning algorithms 160, partial rescan manager 170, and partial rescan precision manager 180 are executable instructions that reside in a non-transitory computer-readable storage medium. The executable instructions are executed by one or more hardware processors of computing devices. This causes the corresponding processors to perform the processing discussed herein and below for 150-180.

Transaction terminals 130 comprise a plurality of hardware devices that execute software as services provided throughout an enterprise over one or more networks (wired, wireless, or a combination of wired and wireless). Moreover, terminals 130 include a variety of integrated peripheral devices, such as and by way of example only, item barcode scanners, cameras, currency and coin accepters and dispensers, card readers (contact based or contactless), touchscreen displays, keypads, receipt printers, and others. Processors of transaction terminals 130 execute transaction software that permit users/customers to checkout of a store/enterprise with purchased items for a customer transaction.

Attendant devices 120 are operated by employees, clerks, and/or attendants of the enterprise and may include transaction terminals 130, laptops (with cameras or interfaced handheld scanners), tablets (with cameras or interfaced handheld scanners), desktops (with cameras or interfaced handheld scanners), phones (with cameras or interfaced handheld scanners), or wearable processing devices (with cameras or interfaced handheld scanners). Processors of attendant devices 120 execute notification and transaction software permitting notifications and instructions from rescan manager 170 and from precision manager 180 to be received and handled by an attendant along with partial rescanning of basket items for any given transaction subject to a partial rescan security check.

User devices 140 include customer/shopper devices that include a mobile application that allows the customer to self-scan items being purchased in a store/enterprise. Processors of user devices 140 execute the mobile application to scan (using a camera of devices 140) item barcodes and/or checkout of the store for a given transaction (paying via a registered payment method or performing payment at a transaction terminal 130).

Enterprise data store 110 includes a variety of information (enterprise data) accessible to trainer 150, machine-learning algorithms 160, partial rescan manager 170, partial rescan precision manager 180, and transaction software/mobile applications associated with devices 120, terminals 130, and devices 140.

Trainer 150 is processed during training sessions of machine-learning algorithms 160. The first training session of for a first machine-learning algorithm 160 trains that algorithm to derive an algorithm that can predict when a given transaction being processed on a terminal 130 or on a user device 140 is to be subject to a partial rescan of the basket items in that given transaction. The first machine-learning algorithm 160 then provides a decision on any real-time transaction being processed as to whether that transaction requires a partial rescan security check to rescan manager 170.

Trainer 150 is also processed during a second training session for a second machine-learning algorithm 160. Transaction logs associated with known thefts identified from past partial rescans are obtained from enterprise data store 110 along with past partial rescans that were not associated with any thefts are used as training data. Basket items for each transaction, transaction features for each transaction (e.g., total number of items, item identifiers, item prices, total transaction price, time of day, calendar day, day of week, item department/category/type associated with each item, etc.), and an indication whether an item was stolen or not for the transaction along with item department/category/type associated with any known stolen item are provided as input to the second machine-learning algorithm 160 as training data. Based on the input of the training data, the second machine-learning algorithm 160 derives an algorithm that when provided a given transaction with its basket items and its transactional data produces as output a total number of items to rescan and indicates as to how the total number of rescan items are to be selected by an attendant for the rescan security check.

For instance, when the partial rescan manager 170 determines based on output provided by the first machine-learning algorithm 160 that a given transaction is to undergo a partial rescan. Rescan manager 170 uses a score representing the likelihood of theft provided as output from the first machine-learning algorithm 160 to determine a total number of items that should be randomly selected from the basket items for rescanning. A higher score results in a higher number of items that should be rescanned while a lower score results in a lower number of items that should be rescanned. Rescan manager 170 then notifies partial rescan precision manager 180 that the transaction is to be rescanned for a total number of randomly selected items from the total number of basket items, which were scanned for the transaction.

Precision manager 180 provides the basket items and transactional data as input to the trained second machine-learning algorithm 160. The second machine-learning algorithm provides back as output to precision manager 180 a ranking of departments/categories/types of items that should be selected for the partial rescan (ranked by probabilities of categories of items that are likely to be stolen). Precision manager 180 selects the top ranked departments and sends a notification to attendant device 120 and/or user device 140 indication that the transaction was selected for a partial rescan, X items are to be selected (X was determined by rescan manager 170), please select items from each of the following categories or departments for rescan A, B, C (categories or departments determined by precision manager 180 based on the ranked departments/categories/types provided by trained second machine-learning algorithm 160).

It may be that all the items are to be selected from a single category (such as Diary or electronics) or multiple items are to be selected from a single category with another item selected from a different category. Precision manager 180 may determine from the ranking and probabilities of theft that a percentage from each of multiple departments are to be selected, such as please select 4 items with 50% or 2 items from Diary, 25% or 1 item from electronics, and 25% or 1 item from Deli. Thresholds for the probabilities returned in the ranked categories by second machine-learning algorithm 160 are used by precision manager 180 to decide what percentage of the total number of items that were flagged for partial rescan should be selected from each category/department.

The system 100 provides guided and precision driven instructions to the attendant as to how many items are to be rescanned and what types/categories of items are to be rescanned, along with a percentage of the rescan total that are to be selected from each identified type/category. This ensures that the partial rescan is likely to produce a greater likelihood of detecting theft during the rescan than what is achievable today through pure random item selection that is not based on specific departments/categories of the items.

During a rescan using the guided and precision-based techniques discussed above, transaction software on attendant device 120 receives the transaction identifier for the transaction and retrieves the transaction details (scanned basket items identifiers) along with transaction price. The attendant then selects a predetermined number of items to rescan in the proportions and from the categories identified by precision manager 180 and operates a camera of device 120 or a handheld scanner interfaced to device 120 and scans items that conform to the instructions. If any of the scanned items were not part of the original scanned basket items associated with the transaction details, attendant is alerted by transaction software to perform a full rescan of all basket items from attendant device 120.

However, if each rescanned item that corresponded to the instructions matches to one of the scanned basket items, then attendant is notified that the rescan check passed and the customer should be permitted to exit the store with the customer's basket items (assuming of course the customer has paid for the transaction and if not the customer is instructed to pay for the transaction total for the transaction).

The system 100 substantially reduces rescan security checks and simultaneously dramatically increases precision and accuracy associated with partial rescan security checks.

According to an embodiment and based on testing, system 100 increases the precision associated with catching theft during partial rescans by approximately 30% or more over a pure undirected random select of items for a partial rescan security check. Moreover, based on testing, system 100 results in a 60% reduction in work hours associated with rescan security checks, which translated to over 480,000 work hours saved per year.

In an embodiment, only one machine-learning algorithm 160 is used to determine whether a transaction is to be subjected to a rescan security check and a ranked listing of departments/categories of items for selection with the rescan. In such a case, the single machine-learning algorithm 160 is trained in manners associated with both the first and the second machine-learning algorithm 160 discussed above.

In an embodiment, both rescan manager 170 and precision manager 180 can be subsumed into a single set of executable instructions or software module that both determines the total number of items that are to be selected for rescan from the transaction and determines the categories/departments/types of items that are to be selected from the basket items (along with any percentages of items from the total number of items that are to be rescanned as discussed above).

In an embodiment, the transaction terminals 130 include Self-Service Terminals (SSTs) and/or Point-Of-Sale (POS) terminals operated by clerks/attendants to check customers out during transactions.

In the case of clerk-operated POS terminals 130, the system 100 may be used as a check on clerk-based theft, where attendant terminals 120 are operated by managers that may in some cases perform partial rescans on clerk scanned items in a transaction.

These embodiments and other embodiments are now discussed with reference to FIGS. 2-4.

The above-referenced embodiments and other embodiments are now discussed with reference to the FIGS. 2-4.

Figure 2:
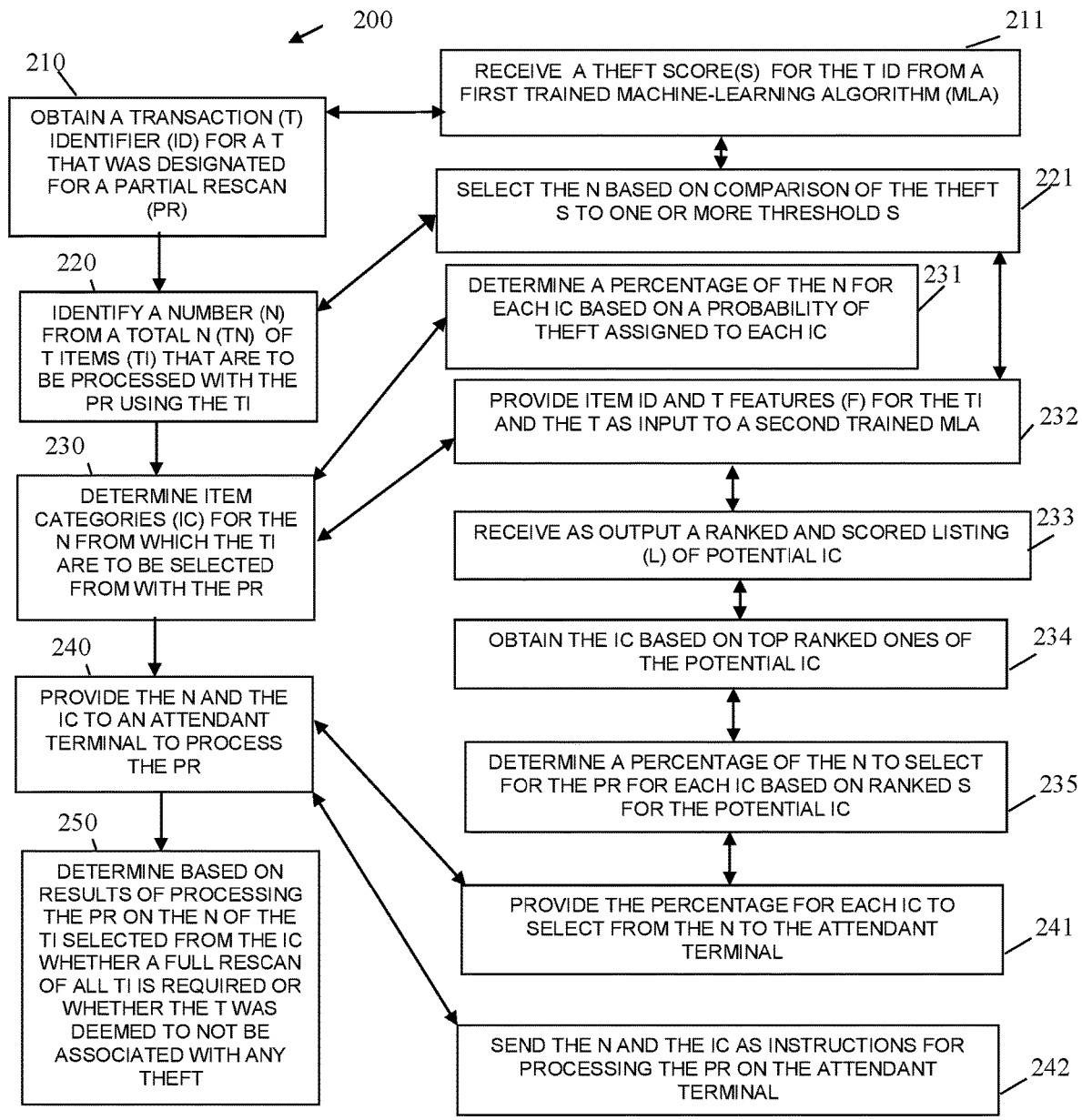
FIG. 2 is a diagram of a method for increasing the precision of partial rescans, according to an example embodiment.

FIG. 2 is a diagram of a method 200 for increasing the precision of partial rescans, according to an example embodiment. The software module(s) that implements the method 200 is referred to as a "partial rescan-precision booster." The partial rescan-precision booster is implemented as executable instructions programmed and residing within memory and/or a non-transitory computer-readable (processor-readable) storage medium and executed by one or more processors of a device. The processor(s) of the device that executes the partial rescan-precision booster are specifically configured and programmed to process the partial rescan-precision booster. The partial rescan-precision booster has access to one or more network connections during its processing. The network connections can be wired, wireless, or a combination of wired and wireless.

In an embodiment, the device that executes the partial rescan-precision booster is a server. In an embodiment, the server is a cloud processing environment that comprises multiple servers cooperating with one another as a single server. In an embodiment, the server is a Local Area Network (LAN) server.

In an embodiment, the partial rescan-precision booster is all of or some combination of: 150-180.

At 210, the partial rescan-precision booster obtains a transaction identifier for a transaction that was designated for a partial rescan security check during which a certain number (less than all) of the items in the transaction are rescanned by an attendant at an attendant terminal for purposes of determining whether the transaction included any items that were not scanned during the transaction and as such may be associated with theft.

In an embodiment, at 211, the partial rescan-precision booster receives a theft score for the transaction identifier from a first trained machine-learning algorithm. That is, a determination that the transaction associated with the transaction identifier is to be subjected to the partial rescan security check is based on an outputted theft score produced by a first trained machine-learning algorithm.

At 220, the partial rescan-precision booster identifies a number from a total number of transaction items that are to be processed with the partial rescan security check using the transaction identifier. The number is less than the total number of transaction items for the transaction.

In an embodiment of 211 and 220, at 221, the partial rescan-precision booster selects the number based on a comparison of the theft score to one or more thresholds. The higher the theft score is, the greater the number is set based on a given threshold that maps the theft score to the number. Moreover, the lower the theft score is, the lower the number is set based on a different threshold.

At 230, the partial rescan-precision booster determines item categories for the number from which the transaction items are to be selected for the partial rescan security check. That is, the number of transaction items are to be selected for rescanning and the item categories are the item departments/categories/types from which selections of the transaction items that are to be subjected to rescanning are made.

In an embodiment, at 231, the partial rescan-precision booster determines a percentage of the N for each item category based on a probability of theft that is assigned to each item category. For example, 25% of N represents a different smaller number that is associated with a specific item category, such as Dairy based on a theft probability assigned to the Dairy item category; assuming N is 4, 25% of 4 is 1 meaning 1 item of the 4 that is to be selected for rescan is to be selected as a Diary product (e.g., milk, cream, cheese, etc.).

In an embodiment of 221 and 230, at 232, the partial rescan-precision booster provides item identifiers and transaction features for the transaction items and the transaction as input to a second trained machine-learning algorithm.

In an embodiment of 232 and at 233, the partial rescan-precision booster receives as output a ranked and scored listing of potential item categories.

In an embodiment of 233 and at 234, the partial rescan-precision booster obtains the item categories based on top ranked ones of the potential item categories.

In an embodiment of 234 and at 235, the partial rescan-precision booster determines a percentage of the N to select for the partial rescan security check for each item category based on ranked scores for the potential item categories.

At 240, the partial rescan-precision booster provides the number and the item categories to an attendant terminal to process the partial rescan security check.

In an embodiment of 235 and 240, at 241, the partial rescan-precision booster provides the percentage for each item category to select from the number to the attendant terminal.

In an embodiment, at 242, the partial rescan-precision booster sends the number and the item categories as instructions for processing the partial rescan security check on the attendant terminal.

In an embodiment, at 250, the partial rescan-precision booster determines based on results of processing the partial rescan security check on the number of transaction items selected from the item categories whether a full rescan of all transaction items is required or whether the transaction was deemed to not be associated with any theft.

Figure 3:
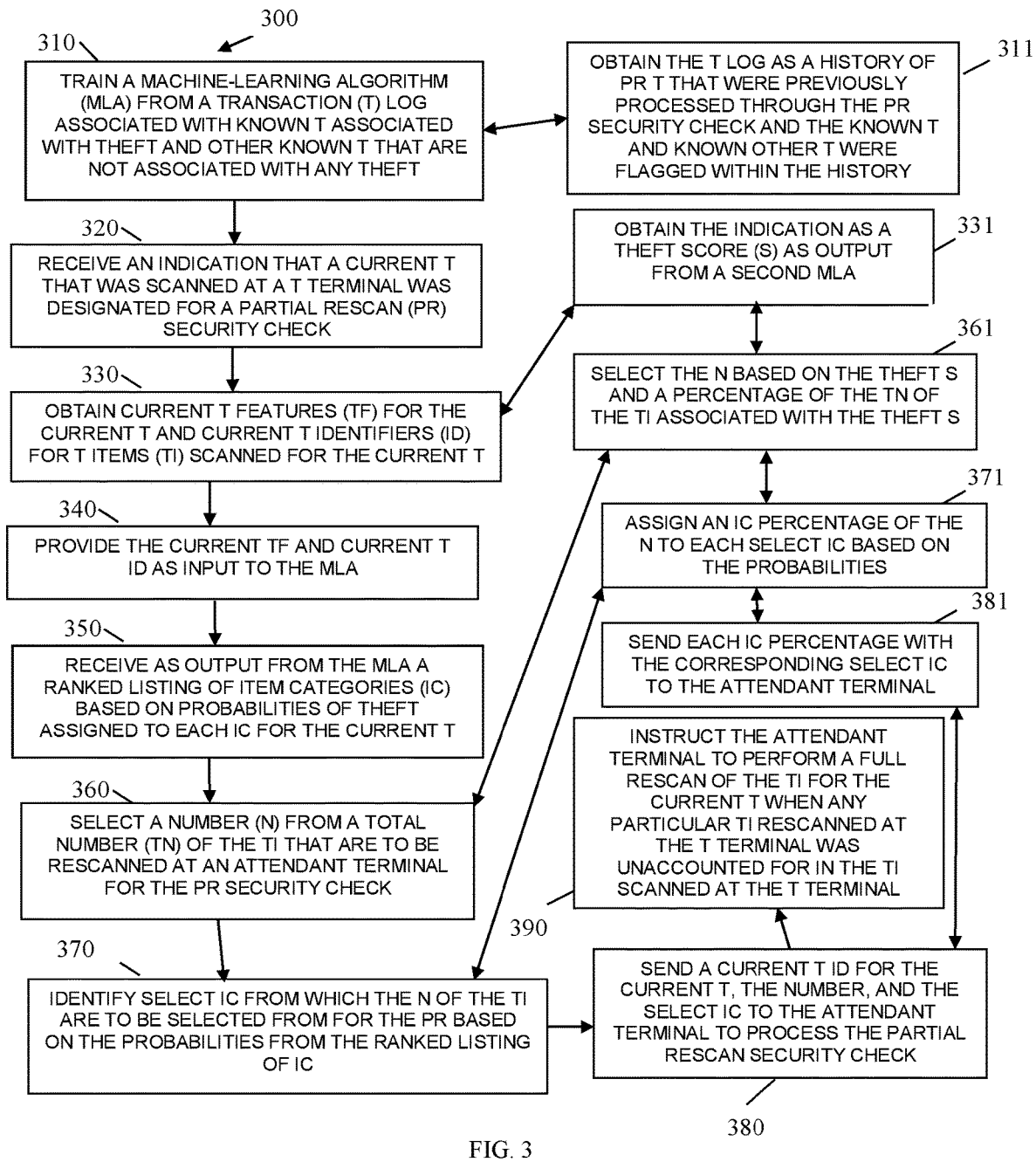
FIG. 3 is a diagram of another method for increasing the precision of partial rescans, according to an example embodiment.

FIG. 3 is a diagram of another method 300 for increasing the precision of partial rescans, according to an example embodiment. The software module(s) that implements the method 300 is referred to as an "partial rescan controller." The partial rescan controller is implemented as executable instructions programmed and residing within memory and/or a non-transitory computer-readable (processor-readable) storage medium and executed by one or more processors of a device. The processors that execute the partial rescan controller are specifically configured and programmed to process the partial rescan controller. The partial rescan controller has access to one or more network connections during its processing. The network connections can be wired, wireless, or a combination of wired and wireless.

In an embodiment, the device that executes the partial rescan controller is a server. In an embodiment, the server is a cloud processing environment that comprises multiple servers cooperating with one another as a single server. In an embodiment, the server is a LAN server that is local to a retail store.

In an embodiment, the partial rescan controller is all or some combination of: 150, 160, 170, 180, and/or the method 200.

The partial rescan controller presents another and, in some ways, enhanced processing perspective to that which was described above with the FIG. 2.

At 310, the partial rescan controller trains a machine-learning algorithm from a transaction log associated with known transaction associated with theft and other known transaction that are not associated with any theft.

In an embodiment, at 311, the partial rescan controller obtains the transaction log as a history of partial rescanned transactions that were previously processed through the partial rescan security check and the known transactions and known other transactions were flagged within the history as being associated with theft and not theft.

At 320, the partial rescan controller receives an indication that a current transaction that was scanned at a terminal was designated for a partial rescan security check.

At 330, the partial rescan controller obtains current transaction features for the current transaction and current transaction identifiers for transaction items scanned for the current transaction.

In an embodiment, at 331, the partial rescan controller obtains the indication as a theft score as output from a second machine-learning algorithm.

At 350, the partial rescan controller receives as output from the machine-learning algorithm a ranked listing of item categories based on probabilities of theft assigned to each item category for the current transaction.

At 360, the partial rescan controller selects a number from a total number of the transaction items (the number is less than the total number) that are to be rescanned at an attendant terminal for the partial rescan security check.

In an embodiment of 331 and 360, at 361, the partial rescan controller selects the number based on the theft score and a percentage of the total number of the transaction items associated with the theft score. For example, the higher the theft score, the higher the percentage of the total number used to determine the number. Similarly, the lower the theft score, the lower the percentage of the total number used to determine the number.

At 370, the partial rescan controller identifies select item categories from which the number of the transaction items are to be selected from for the partial rescan security check based on the probabilities from the ranked listing of item categories.

In an embodiment of 261 and 370, at 371, the partial rescan controller assigns an item category percentage of the number to each select item category based on the probabilities.

At 380, the partial rescan controller sends a current transaction identifier for the current transaction, the number, and the select item categories to the attendant terminal to process the partial rescan security check.

In an embodiment of 371 and 380, at 381, the partial rescan controller sends each item category percentage with the corresponding select item category to the attendant terminal.

In an embodiment, at 390, the partial rescan controller instructs the attendant terminal to perform a full rescan of the transaction items for the current transaction when any particular transaction item rescanned at the transaction terminal was unaccounted for in the transaction items scanned at the transaction terminal.

Figure 4:
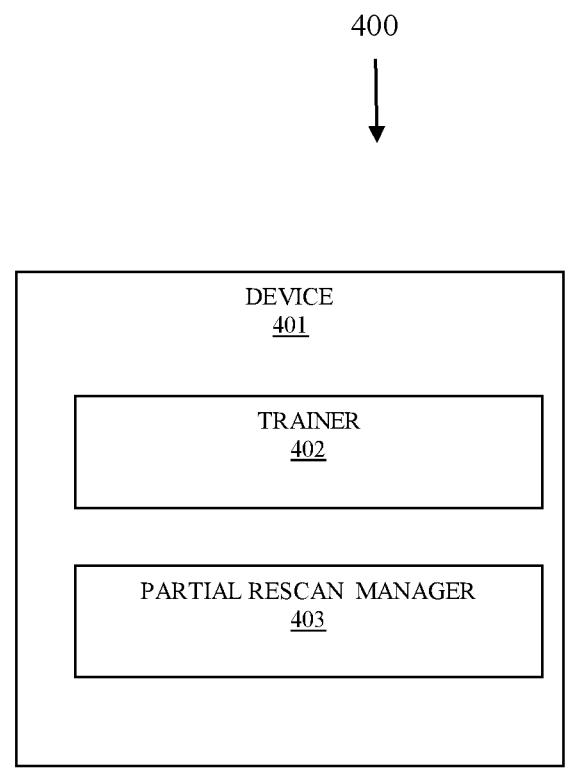
FIG. 4 is a diagram of another system for increasing the precision of partial rescans, according to an example embodiment.

FIG. 4 is a diagram of a system 400 for increasing the precision of partial rescans, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 is the system 100.

The system 400 includes a processing device 401, a trainer 402, and a partial rescan manager 403.

In an embodiment, the processing device 401 is a server. In an embodiment, the server is a collection of servers that cooperate as a cloud processing environment. In an embodiment, the processing device 401 is a LAN server.

The trainer 402 is a set of executable instructions that is executed on one or more hardware processors of the processing device 401 from a non-transitory computer-readable storage medium or memory.

The partial rescan manager 403 is also a set of executable instructions that is executed on one more hardware processors of the processing device 401 from a non-transitory computer-readable storage medium or memory.

The trainer 402, when executed by the processor(s) of the device 401, is configured to cause the processor to perform processing comprising: training a machine-learning algorithm on a history of partial rescan transactions flagged with first indications for known rescan transactions associated with theft and flagged with second indications for known other rescan transactions known to not be associated with any theft.

In an embodiment, the trainer 402 is the trainer 150.

The partial rescan manager 403, when executed by the processor(s) of the device 401, is configured to cause the processor to perform processing comprising: 1) receiving an alert that a current transaction was identified for a partial rescan security check; 2) selecting a number from a total number of transaction items associated with the current transaction that are to be selected for the partial rescan security check; 3) providing current transaction features for the current transaction to the machine-learning algorithm as input; 4) receiving as output from the machine-learning algorithm a ranked listing of item categories based on probabilities of theft assigned to each item category; 5) identifying select item categories from the item categories based on the corresponding probabilities; and 6) sending a current transaction identifier for the transaction, the number, and the select item categories to an attendant terminal to process the partial rescan security check on the transaction items of the current transaction.

In an embodiment, the partial rescan manager 403, when executed by the processor(s) of the device 401, is further configured, in 1) to cause the processor to perform processing comprising: receiving the alert from a second machine-learning algorithm that identified the current transaction for the partial rescan security check based at least in part on the current transaction features.

In an embodiment, the partial rescan manager 403 is all of or some combination of: 150, 160, 170, 180, method 200, and/or method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   training a first machine-learning algorithm on a transaction log associated with known transactions associated with theft and other known transactions that are not associated with any theft;
   receiving an indication from a second machine-learning algorithm that a current transaction that was scanned at a transaction terminal was designated for a partial rescan security check;
   obtaining current transaction features for the current transaction and current transaction identifiers for transaction items scanned for the current transaction;
   providing the current transaction features and current transaction identifiers as input to the first machine-learning algorithm;
   receiving as output from the first machine-learning algorithm a ranked listing of item categories based on probabilities of theft assigned to each item category for the current transaction;
   selecting a number from a total number of the transaction items that are to be rescanned at an attendant terminal for the partial rescan security check based on the indication, wherein when the indication is higher, the number is higher and when the indication is lower, the number is lower, wherein the indication is provided as output from the first machine-learning algorithm as a score associated with potential theft for the current transaction;
   identifying select item categories from which the number of the transaction items are to be selected from with the partial rescan security check based on the probabilities from the ranked listing of item categories; and
   sending a current transaction identifier for the current transaction, the number, and the select item categories to the attendant terminal to process the partial rescan security check.

2. The method of claim 1, wherein training further includes obtaining the transaction log as a history of partial rescan transactions that were previously processed through the partial rescan security check and the known transactions and known other transactions were flagged within the history.

3. The method of claim 1, wherein receiving further includes obtaining the indication as output from the second machine-learning algorithm.

4. The method of claim 3, wherein selecting further includes selecting the number based on the theft score and a percentage of the total number of the transaction items associated with the theft score.

5. The method of claim 4, wherein identifying further includes assigning an item category percentage of the number to each select item category based on the probabilities.

6. The method of claim 5, wherein sending further sending each item category percentage with the corresponding select item category to the attendant terminal.

7. The method of claim 1 further comprising, instructing the attendant terminal to perform a full rescan of the transaction items for the current transaction when any particular transaction item rescanned at the transaction terminal was unaccounted for in the transaction items scanned at the transaction terminal.

8. A system, comprising:
   a processing device having at least one processor configured to execute instructions from a non-transitory computer-readable storage medium, the instructions representing trainer and a partial rescan manager;
   the trainer is configured when executed by the at least one processor to cause the processor to perform processing comprising:
   training a machine-learning algorithm on a history of partial rescan transactions flagged with first indications for known rescan transactions associated with theft and flagged with second indications for known other rescan transactions known to not be associated with any theft;
   the partial rescan manager is configured when executed from the at least one processor to cause the processor to perform processing comprising:
   receiving an alert that a current transaction was identified for a partial rescan security check based on output from a second machine-learning algorithm;
   selecting a number from a total number of transaction items associated with the current transaction that are to be selected for the partial rescan security check based on a value associated with the alert, wherein when the value is higher, the number is higher and when the value is lower, the number is lower, wherein the value is a score associated with potential theft for the current transaction;

providing current transaction features for the current transaction to the machine-learning algorithm as input;

receiving as output from the machine-learning algorithm a ranked listing of item categories based on probabilities of theft assigned to each item category;

identifying select item categories from the item categories based on the corresponding probabilities; and sending a current transaction identifier for the transaction, the number, and the select item categories to an attendant terminal to process the partial rescan security check on the transaction items of the current transaction.

9. The system of claim 8, wherein the partial rescan manager is further configured when executed from the at least one processor to cause the processor to processing comprising: receiving the alert from a second machine-learning algorithm that identified the current transaction for the partial rescan security check based at least in part on the current transaction features.

\* \* \* \* \*